United States Patent
Mizunashi

(10) Patent No.: US 10,999,385 B2
(45) Date of Patent: May 4, 2021

(54) INFORMATION PROCESSING APPARATUS, INFORMATION PROCESSING SYSTEM, INFORMATION PROCESSING METHOD, AND RECORDING MEDIUM

(71) Applicant: Ryosuke Mizunashi, Kanagawa (JP)

(72) Inventor: Ryosuke Mizunashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/351,578

(22) Filed: Mar. 13, 2019

(65) Prior Publication Data

US 2019/0289086 A1 Sep. 19, 2019

(30) Foreign Application Priority Data

Mar. 19, 2018 (JP) .............................. JP2018-050591

(51) Int. Cl.
*H04L 29/08* (2006.01)
*H04L 12/841* (2013.01)
*H04L 29/06* (2006.01)

(52) U.S. Cl.
CPC ............ *H04L 67/22* (2013.01); *H04L 47/286* (2013.01); *H04L 63/02* (2013.01); *H04L 63/08* (2013.01)

(58) Field of Classification Search
CPC ......... H04L 67/22; H04L 63/02; H04L 63/08; H04L 47/286; H04L 63/0227; H04L 63/101; H04L 63/083; H04L 63/1408; G06F 3/1209; G06F 3/1285; G06F 3/1231; G06F 3/12; G06F 3/1236

USPC ........................................................ 709/223
See application file for complete search history.

(56) References Cited

U.S. PATENT DOCUMENTS

| | | | |
|---|---|---|---|
| 2009/0249131 A1* | 10/2009 | Mitomo | H04L 67/38 714/48 |
| 2010/0188991 A1* | 7/2010 | Raleigh | G06Q 10/06315 370/252 |
| 2014/0094159 A1* | 4/2014 | Raleigh | H04W 24/02 455/418 |
| 2015/0331736 A1* | 11/2015 | Kawasumi | G06F 11/079 714/37 |
| 2016/0285949 A1* | 9/2016 | Li | H04W 12/08 |
| 2019/0098123 A1* | 3/2019 | Gupta | H04M 3/42059 |

FOREIGN PATENT DOCUMENTS

| JP | 2007-266834 | 10/2007 |
|---|---|---|
| JP | 2009-169966 | 7/2009 |
| JP | 2009-296357 | 12/2009 |

* cited by examiner

*Primary Examiner* — Tu T Nguyen
(74) *Attorney, Agent, or Firm* — Oblon, McClelland, Maier & Neustadt, L.L.P.

(57) ABSTRACT

An information processing apparatus connected to at least one device via a first network includes: a network interface to mediate communication between an external device, which is connected to a second network connected to the first network via a firewall, and the device; a memory that stores a communication log related to communication between the external device and the device; and circuity to create a list including information on the device based on the communication log.

15 Claims, 10 Drawing Sheets

FIG. 4

| No. | Time | Source | Destination | Protocol | Info |
|---|---|---|---|---|---|
| 72 | 55.319518 | 192.168.1.254 | 192.168.1.1 | HTTP | HTTP/1.1 200 OK |

⊞ Frame 72 (569 bytes on wire, 569 bytes captured)
⊞ Ethernet II, Src: ... Dst: ...
⊞ Internet Protocol, Src: 192.168.1.254 (192.168.1.254), Dst: 192.168.1.1 (192.168.1.1)
    Version : 4
    Header length : 20 bytes
    ⊞ Differentiated Services Field: 0x00 (DSCP 0x00 Default; ECN:0x00)
    Total Length: 555
    Identification: 0x774d (30541)
⊞ Transmission Control Protocol, Src Port: http (80), Dst port: 50619 (50619), Seq: 257, Ack: 560
    Source port ; http (80)
    Destination port : 50619 (50619)
    Sequence number : 257 (relative sequence number)
⊞ Flags: 0x19 (FIN, PSH, ACK)
    0... .... =Congestion window Reduced (CWR) : not set
    .0.. .... =ECN-Echo : not set

FIG. 8

| IP ADDRESS (OR HOST NAME) | CREATED DATE AND TIME | MAC ADDRESS | VENDOR NAME | DEVICE TYPE | OS TYPE | USER ID |
|---|---|---|---|---|---|---|
| 192.168.0.1 | 2017/10/27 | 00:00:74:00:00:01 | **** | MFP | Xxxx | Hoge1234 |
| Hoge.****.co.jp | 2017/8/25 | 11:22:33:44:55:66 | **** | IWB | Yyyy | 12345678 |
| 192.168.10.12 | 2017/9/1 | AA:BB:CC:DD:EE:FF | AAAA | PC | OS12 | Fuga5678 |

| OS | TTL | WINDOW SIZE (BYTES) |
|---|---|---|
| OS1 | 64 | 5,840 |
| OS2 | 64 | 5,720 |
| OS3 | 64 | 32,120 |
| OS4 | 64 | 65,635 |
| OS5 | 64 | 16,384 |
| OS6 | 128 | 16,384 |
| OS7 | 128 | 65,535 |
| OS8 | 128 | 8,192 |
| OS9 | 255 | 4,128 |
| OS10 | 255 | 8,760 |
| OS11 | 64 | 65,535 |

INFORMATION PROCESSING APPARATUS, INFORMATION PROCESSING SYSTEM, INFORMATION PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2018-050591, filed on Mar. 19, 2018, in the Japan Patent Office, the entire disclosure of which is hereby incorporated by reference herein.

BACKGROUND

Technical Field

The present invention relates to an information processing apparatus, an information processing system, an information processing method, and a recording medium.

Description of the Related Art

In a system that collectively manages devices, a technique of searching for a device that is connected to a network in order to reduce the labor of registering the device to be managed has been known.

However, a conventional search technique enabled search for only the devices supporting a communication protocol for search. When various types of devices are to be managed, a problem encountered is that devices not supporting the communication protocol for search are frequently found, and registration of such devices is performed manually and is troublesome.

SUMMARY

Example embodiments of the present invention include an information processing apparatus connected to at least one device via a first network including: a network interface to mediate communication between an external device, which is connected to a second network connected to the first network via a firewall, and the device; a memory that stores a communication log related to communication between the external device and the device; and circuity to create a list including information on the device based on the communication log.

Example embodiments of the present invention include an information processing method performed by the above-described information processing apparatus, and a recording medium storing a program for controlling the information processing apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4 is a view illustrating an example of a communication log according to the embodiment of the present invention;

FIG. 8 is a table illustrating an example of a device list according to the embodiment of the present invention;

Figure 1:
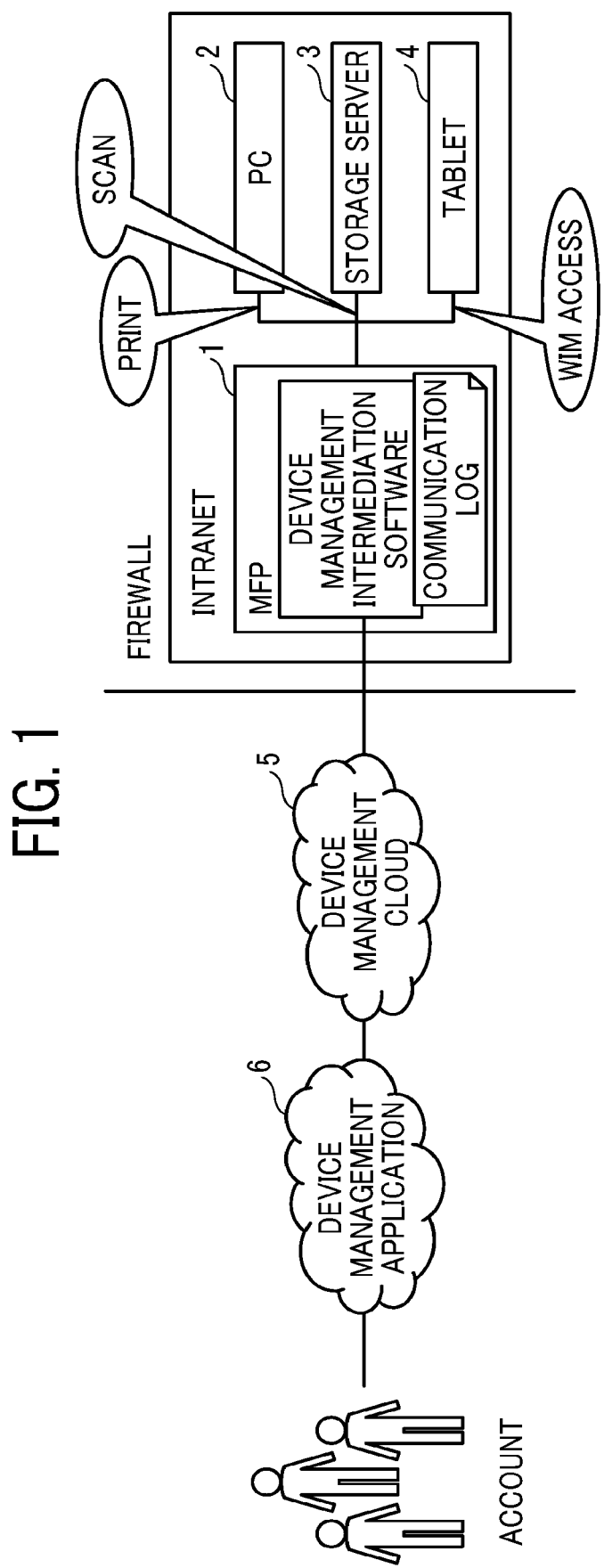
FIG. 1 is a view illustrating a configuration example of an information processing system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present invention are described below with reference to the accompanying drawings.

FIG. 1 is a view illustrating a configuration example of an information processing system according to an embodiment of the present invention. As illustrated in FIG. 1, the information processing system according to the embodiment of the present invention includes at least one device that resides on an external network, and at least one device that resides on an internal network. The internal network is, for example, an intranet, and is an example of a first network. The external network is an example of a second network. The intranet is connected to the external network via a firewall. An MFP 1, a PC 2, a storage server 3, and a tablet 4 are connected to each other via the intranet. A device management cloud 5 and a device management application 6 are connected to the external network.

The MFP 1 is an example of an information processing apparatus that manages and monitors the PC 2, the storage server 3, the tablet 4, or the like, which are the devices to be managed. Although FIG. 1 illustrates three devices as the devices connected to the MFP1, more devices may be connected to the MFP1. The MFP 1 provides the devices with functions such as printing, scanning, and Windows Imaging Format (WIM) access. A communication log at a time when the MFP 1 provides the function to the device is recorded in a storage unit, which is controlled by device management intermediation software. The device management intermediation software provides the function of managing the devices connected to the MFP 1, together with the device management cloud 5 and the device management application 6.

The device management application 6 is an application operable by an external device that resides on the external network. The external device may be an information processing apparatus such as a personal computer (PC) or a server. The device management application 6 is connected to the device management cloud 5, which is a cloud service, by a login to the cloud by a user having an account. The device management application 6 is permitted to access the device connected to the MFP 1 by the device management intermediation software, and refers to information on device management. In other words, as the MFP 1 mediates communication, the device management application 6 can communicate with the device connected to the MFP 1.

Figure 2:
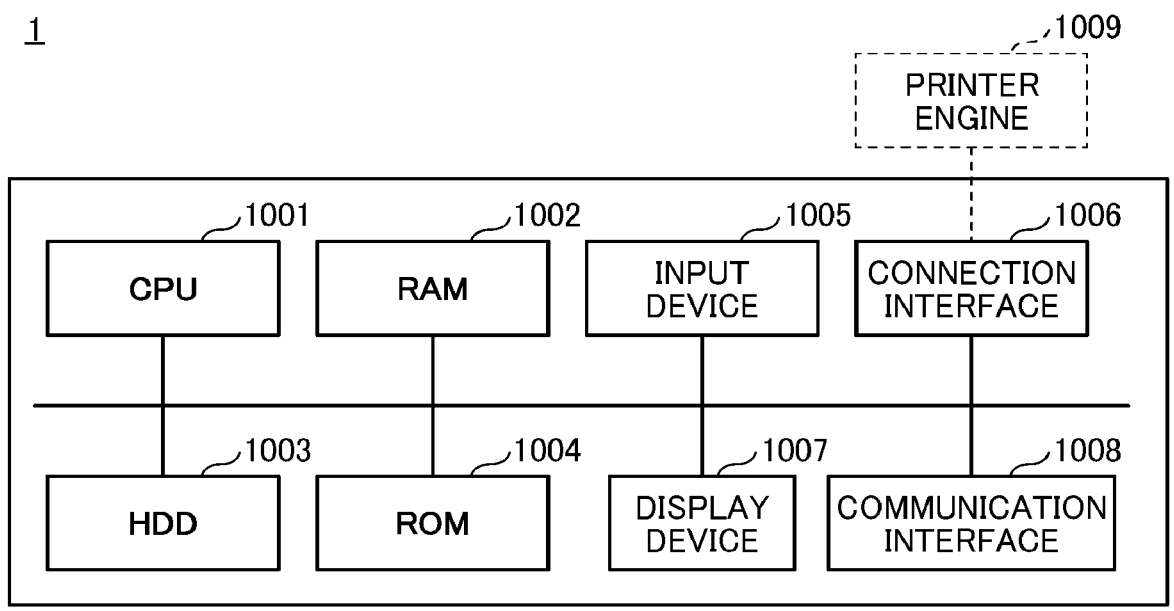
FIG. 2 is a diagram illustrating a hardware configuration example of a multifunction peripheral (MFP) according to the embodiment of the present invention.

FIG. 2 is a diagram illustrating a hardware configuration example of the MFP 1 according to the embodiment of the present invention. As illustrated in FIG. 2, the MFP 1 includes a central processing unit (CPU) 1001, a random access memory (RAM) 1002, a hard disk drive (HDD) 1003, a read-only memory (ROM) 1004, an input device 1005, a connection interface 1006, a display device 1007, and a communication interface 1008.

The CPU 1001 includes a processor and peripheral circuits, and controls the entire MFP 1. The ROM 1004 is a nonvolatile storage device that stores a program executed by the CPU 1001, and data to be used by the CPU 1001. The RAM 1002 is a storage device used as a work area when a program executed by the CPU 1001 performs control. The HDD 1003 is an auxiliary storage device that stores a program executed by the CPU 1001, and data to be used by the CPU 1001. The HDD 1003 may be, for example, a hard disk drive, or an auxiliary storage device including a flash memory or the like.

The input device 1005 is a device by which a user or an administrator can perform various input operations. The input device 1005 includes, for example, a mouse, a keyboard, a touch panel, and the like. The display device 1007 displays various kinds of information to the user or an observer, etc. The display device 1007 may be, for example, a liquid crystal display, or a touch panel integrated with the input device 1005. The connection interface 1006 is an interface circuit for connecting with a printer engine 1009. The printer engine 1009 is a hardware for performing printing or scanning. The communication interface 1008 is a communication device (circuit) which transmits and receives data via a network. The communication interface 1008 may be, for example, a wireless LAN interface, a wired LAN interface, or an interface between the MFP1 and a communication network of the other schemes.

Note that the PC 2, the storage server 3, or the tablet 4, which corresponds to the device, and the information processing apparatus on which the device management application 6 operates, may have the same configuration as the hardware configuration example illustrated in FIG. 2.

Figure 3:
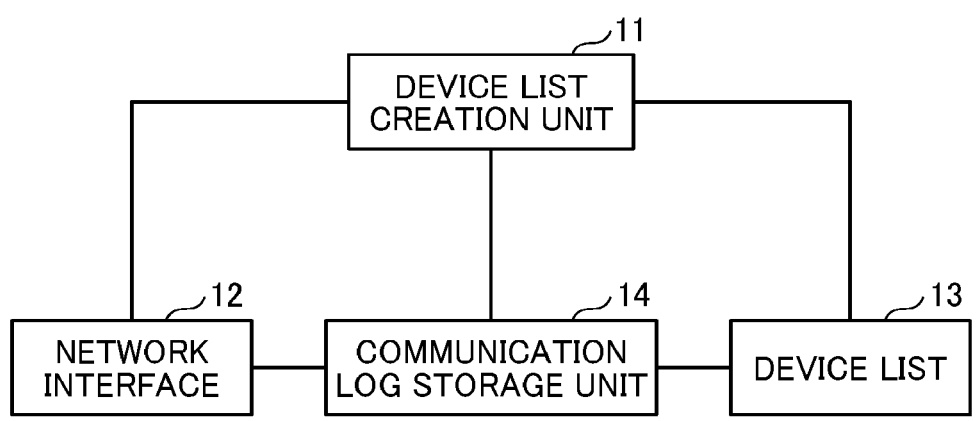
FIG. 3 is a diagram illustrating a functional configuration example of the MFP according to the embodiment of the present invention.

FIG. 3 is a diagram illustrating a functional configuration example of the MFP 1 according to the embodiment of the present invention. As illustrated in FIG. 3, the MFP 1 includes a device list creation unit 11, a network interface 12, a device list 13, and a communication log storage unit 14. Each functional unit illustrated in FIG. 3 is implemented by the device management intermediation software operated by the CPU 1001 on the MFP 1 depicted in FIG. 1.

The device list creation unit 11 has the function of obtaining (such as extracting) information necessary for device management from the communication log with respect to the devices connected to the MFP 1, and adding information necessary for the device management. Further, the device list creation unit 11 has the function of communicating with an external server, etc.

The network interface 12 controls communication between the external device on which the device management application 6 operates and the device connected to the MFP 1. The network interface 12 is implemented, for example, by the communication interface 1008, and the CPU 1001 operated by the device management intermediation software. The network interface 12 acquires a communication log, when the external device on which the device management application 6 operates and the device connected to the MFP 1 communicate with each other, and transmits the communication log to the communication log storage unit 14. The communication log may include packet data and a user ID.

The device list 13 is a list of devices connected to the MFP 1. The device list 13 is created by the device list creation unit 11.

The communication log storage unit 14 stores the communication log including the packet data and the user ID at the time when communication was executed between the device connected to the MFP 1 and the external device on which the device management application 6 operates. The communication log storage unit 14 is implemented by the memories (the ROM 1004, the RAM 1002, and the like) of the MFP 1, and the CPU 1001 operated by the device management intermediation software.

FIG. 4 is a view illustrating an example of a communication log according to the embodiment of the present invention. In FIG. 4, an example of the communication log of the packet data is described.

In the packet data in a case where the device is connected to the external device, an IP address of the external device is included in a destination part of the IP header. In the destination part of a MAC address, the MAC address of a hardware device to which the device is connected by Ethernet (registered trademark) is set.

In packet data in a case where the external device is connected to the device, an IP address of a gateway of the intranet to which the device is connected is included in the destination part of the IP header. Alternatively, when the MFP 1 can be directly connected from an external access network, a global IP address of the MFP 1 may be included in the destination part of the IP header.

Alternatively, the device may be connected to the external device via a wireless LAN, etc., instead of Ethernet.

Figure 5:
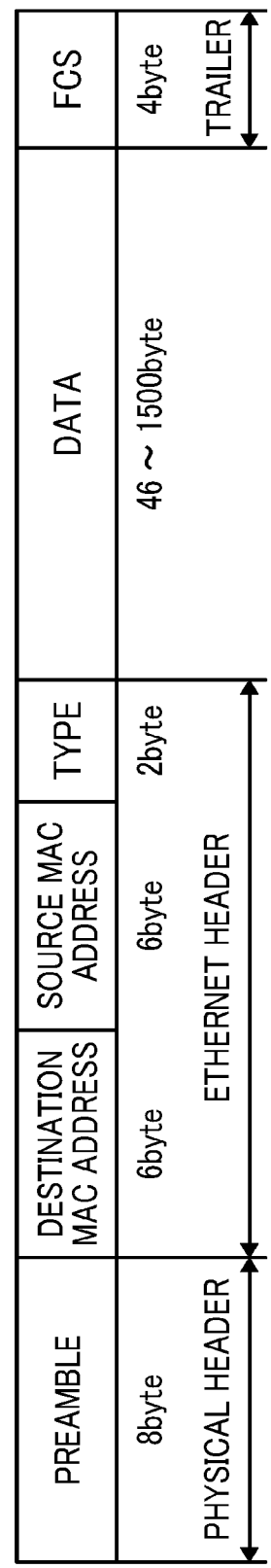
FIG. 5 is a view illustrating an example of a communication log according to the embodiment of the present invention.

FIG. 5 is a view illustrating another example of a communication log according to the embodiment of the present invention. Referring to FIG. 5, an Ethernet header format is described.

As illustrated in FIG. 5, the Ethernet header format includes "preamble", "destination MAC address", "source MAC address", "type", "data", and "FCS". When the device is the source of transmission, the MAC address of the device is set as the "source MAC address". Further, the MAC address of a hardware device to which the device is connected via Ethernet is set as the "destination MAC address".

Figure 6:
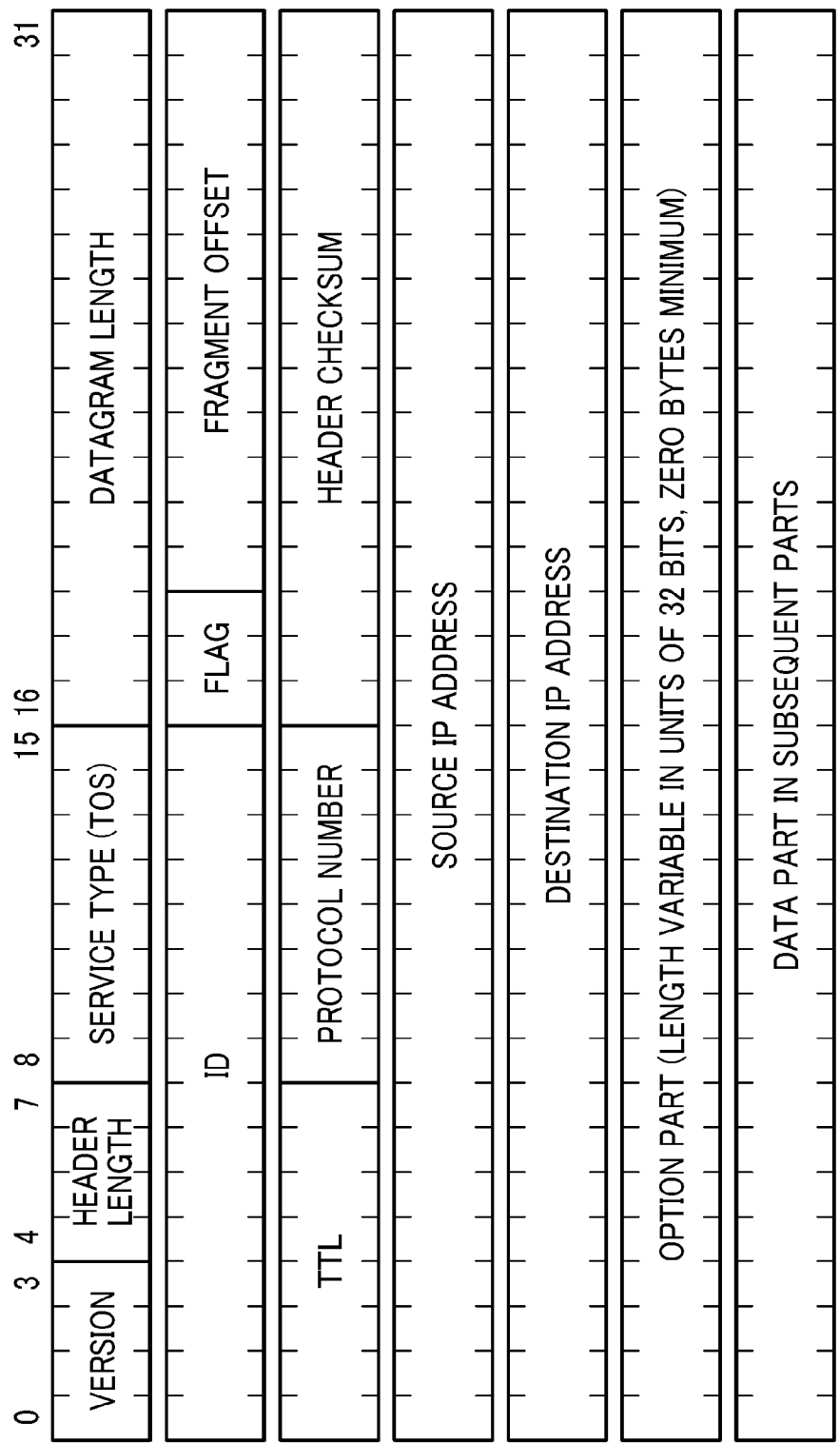
FIG. 6 is a view illustrating an example of a communication log according to the embodiment of the present invention.

FIG. 6 is a view illustrating yet another example of a communication log according to the embodiment of the present invention. Referring to FIG. 6, an IP header format is described.

As illustrated in FIG. 6, the IP header format includes "version", "header length", "service type", "datagram length", "ID", "flag", "fragment offset", "TTL (Time to Live)", "protocol number", "header checksum", "source IP address", "destination IP address", "option part", and "data part".

When the device is the source of transmission, the "source IP address" includes the IP address of the device, and the "destination IP address" includes the IP address of the external device.

Figure 7:
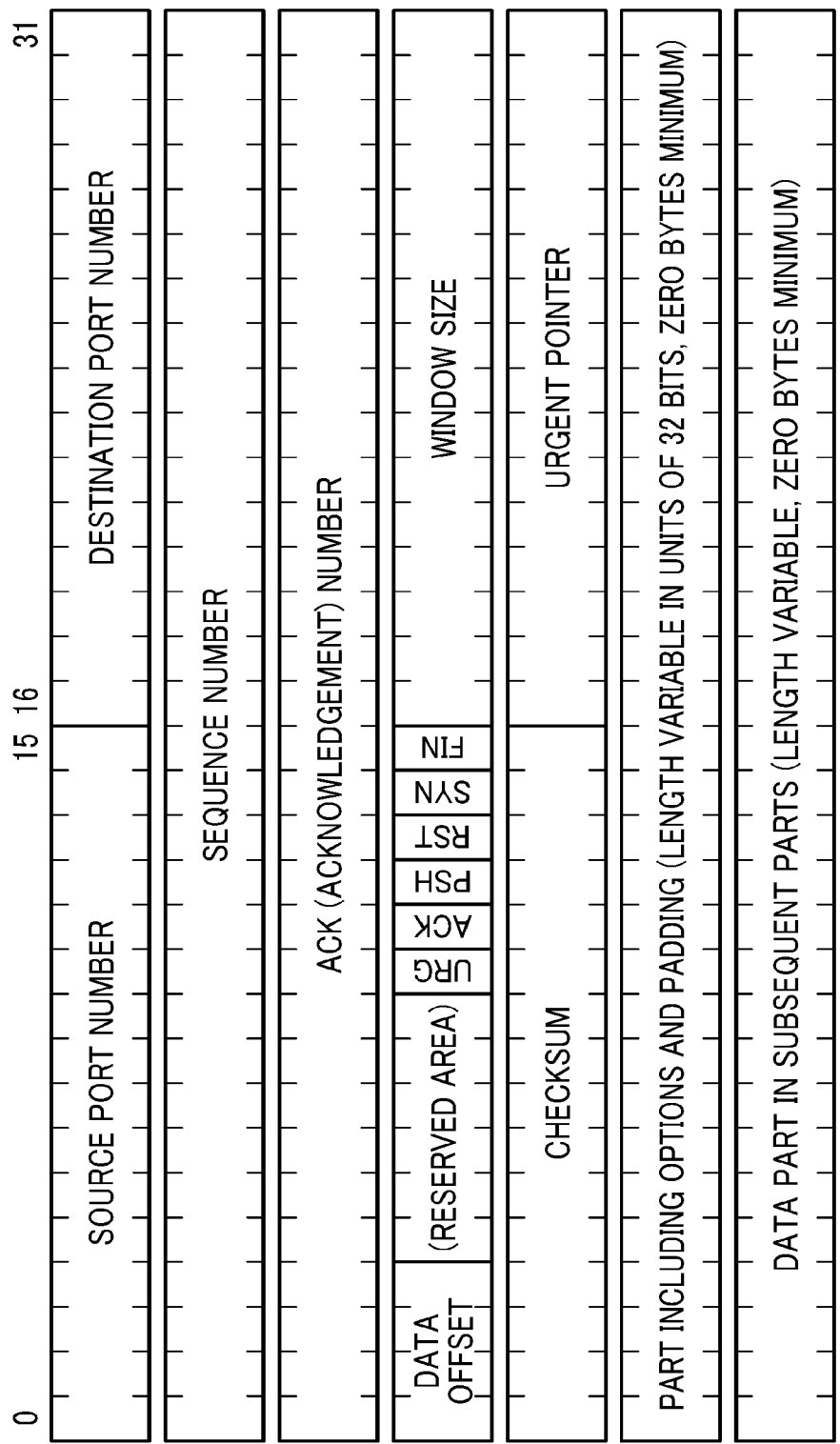
FIG. 7 is a view illustrating an example of a communication log according to the embodiment of the present invention.

FIG. 7 is a view illustrating yet another example of a communication log according to the embodiment of the present invention. Referring to FIG. 7, a TCP header format is described.

As illustrated in FIG. 7, the TCP header format includes "source port number", "destination port number", "sequence number", "ACK number", "data offset", control flags "URG", "ACK", "PSH", "RST", "SYN" and "FIN", "window size", "checksum", "urgent pointer", "part including options and padding", and "data part".

Port numbers used when the device communicates with the external device are set to the "source port number" and the "destination port number", respectively.

FIG. 8 is a table illustrating an example of a device list according to the embodiment of the present invention. As illustrated in FIG. 8, the device list includes "IP address (or host name)", "created date and time", "MAC address", "vendor name", "device type", "OS type", and "user ID". The device list is created from the communication log, etc., of the device.

The item "IP address" denotes an IP address of the device. When a "host name" is acquired, the device list may include the host name of the device. The item "created date and time" denotes the date and time when an entry of the device in the device list was made. The item "MAC address" denotes the MAC address of the device. The item "vendor name" denotes the name of a vendor of the device. The item "OS type" denotes the type of OS used in the device. The item "user ID" denotes the user ID used for a login in the external device which communicated with the device.

Figures 9A, 9B:
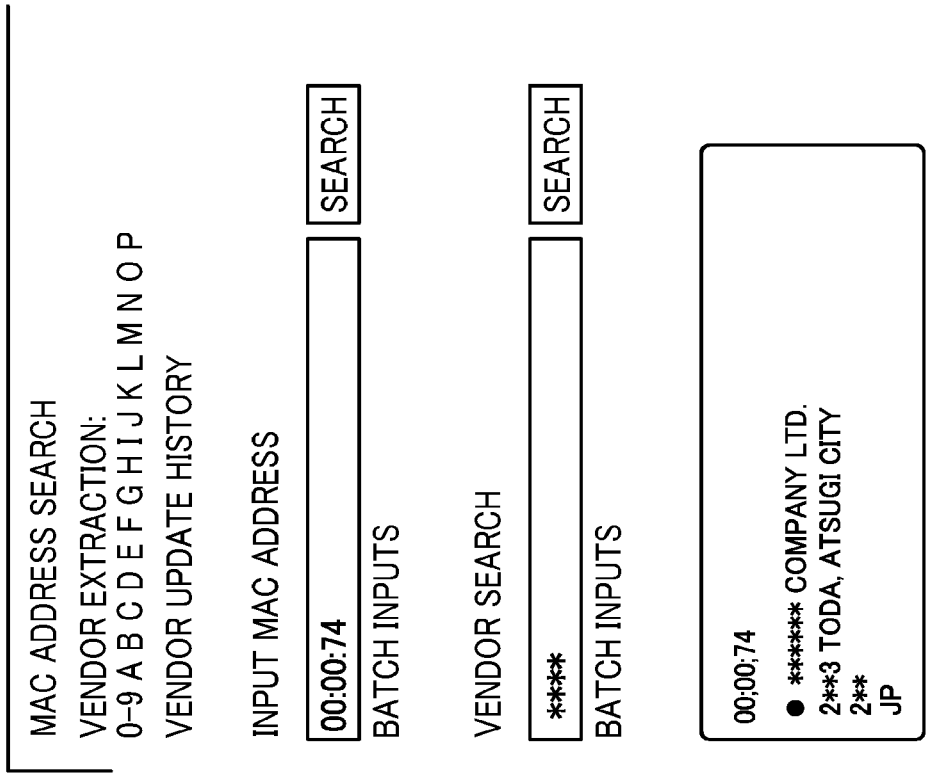
FIGS. 9A and 9B are views for explaining mapping of the communication log and the device list according to the embodiment of the present invention.

FIGS. 9A and 9B are views for explaining mapping of the communication log and the device list according to the embodiment of the present invention. The IP address and the MAC address of the device are acquired from the communication log. Further, when a host name of the device is to be acquired, communication with a Domain Name System (DNS) server is carried out to obtain the host name from the IP address. The created date and time of the entry of the device list is given at the time of occurrence of communication using a system call of the date and time acquisition.

The vendor name of the device is acquired from external service as illustrated in FIG. 9A, by using the upper three bytes of the MAC address.

The device type of the device is acquired by executing a tool in the IP address of the device.

The OS type of the device may be acquired by using a scan tool, or may be specified from the communication log. In the case of specifying the OS type from the communication log, the OS may be specified by referring to a table indicating the relationship among the OS, TTL, and the window size, as illustrated in FIG. 9B, which is stored in advance.

With respect to the user ID, a corresponding user ID is acquired when a user accesses the device from the external device and the user is authenticated.

Figure 10:
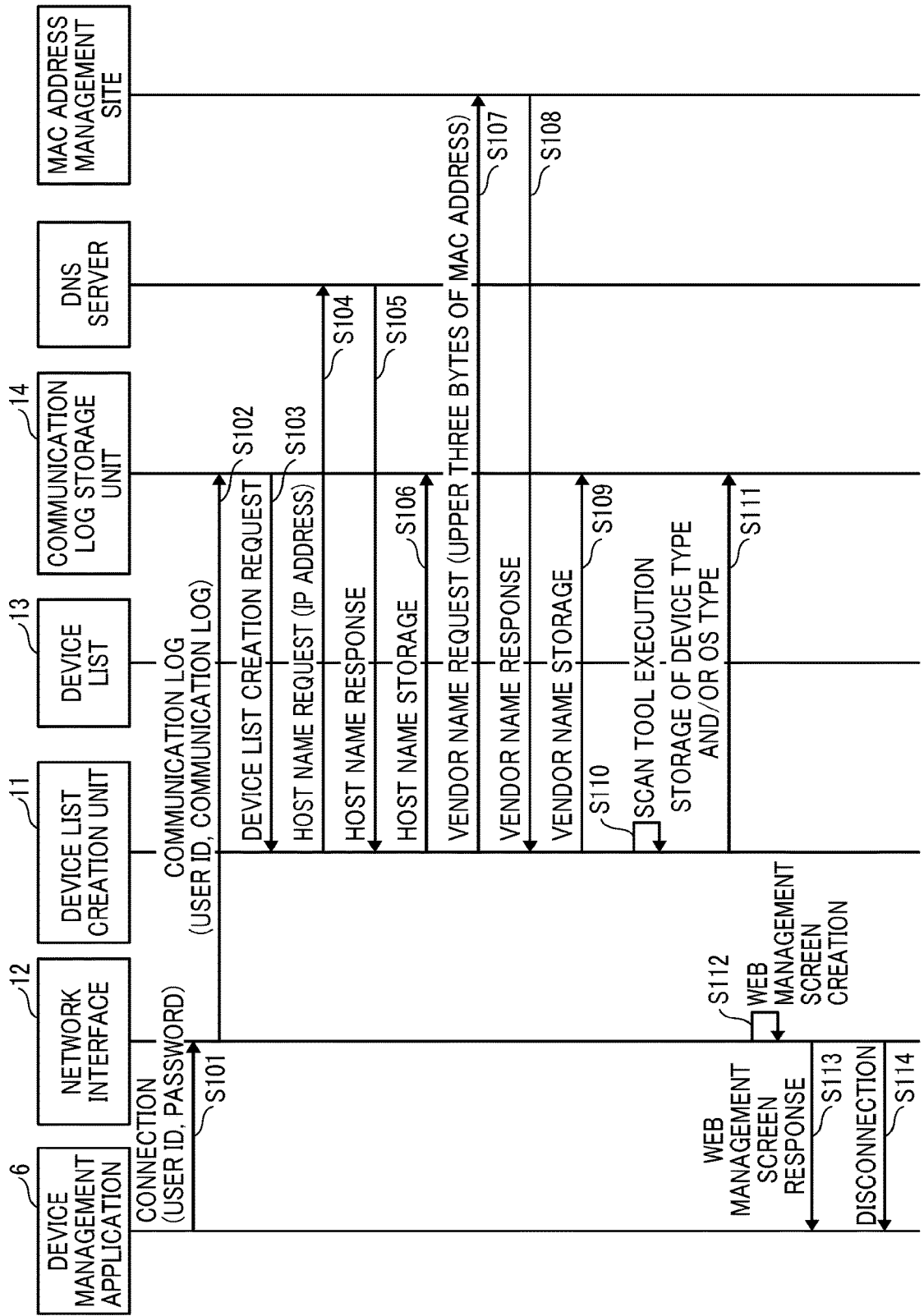
FIG. 10 is a sequence diagram illustrating an example of a device list creation process according to the embodiment of the present invention.

FIG. 10 is a sequence diagram illustrating an example of a device list creation process according to the embodiment of the present invention. As illustrated in FIG. 10, a DNS server and a MAC address management site that reside on the external network, for example, are used.

In step S101, the device management application 6 transmits a connection request including a user ID and a password to the network interface 12. Then, the network interface 12 transmits the user ID and a communication log to the communication log storage unit 14 (S102). The network interface 12 may start intermediation of communication between the external device on which the device management application 6 operates and the device connected to the MFP 1. Then, the communication log storage unit 14 stores the received user ID and communication log.

In step S103, the communication log storage unit 14 transmits a device list creation request to the device list creation unit 11. Then, the device list creation unit 11 transmits a host name request to the DNS server, on the basis of the IP address included in the device list creation request received in step S103 (S104). Then, the device list creation unit 11 receives the host name from the DNS server (S105). Then, the device list creation unit 11 transmits the host name to the communication log storage unit 14 to have the host name saved (S106).

In step S107, the device list creation unit 11 transmits a vendor name request to the MAC address management site, on the basis of the upper three bytes of the MAC address included in the device list creation request received in step S103. Then, the device list creation unit 11 receives the vendor name from the MAC address management site (S108). Then, the device list creation unit 11 transmits the vendor name to the communication log storage unit 14 to have the vendor name saved (S109).

In step S110, the device list creation unit 11 executes a scan tool on the device if the device list creation unit 11 includes the scan tool. The device list creation unit 11 acquires the device type and the OS type as a result of executing the scan tool. Alternatively, the OS type is acquired from the information included in the communication log as explained in FIG. 9B. Then, the device list creation unit 11 transmits the device type and the OS type, or the OS type to the communication log storage unit 14 to have the device type and the OS type, or the OS type stored (Sill).

In step S112, the network interface 12 creates a web management screen including the created device list. The web management screen is a screen displaying information indicating a management state of the device that can be referred to from the external device.

In step S113, the external device receives a response through the web management screen output by the network interface 12. Then, communication is disconnected (S114), and the device list creation process is finished.

As described above, according to the embodiment of the present invention, the MFP 1 can create a device list including the IP address or the host name, the created date and time of the device list, the MAC address, the vendor name, the device type, the OS type, and the user ID, by using a communication log obtained when the external device and the device communicated with each other. Also, when the external device communicates with a plurality of devices, the MFP 1 can create a device list of the plurality of devices by using the communication log of each of the devices.

In other words, a device list of management target candidates can be created by using a communication log of an intermediary device (for example, an MFP, a server, etc.) that communicates with a plurality of devices installed in an office or a workplace.

Figure 11:
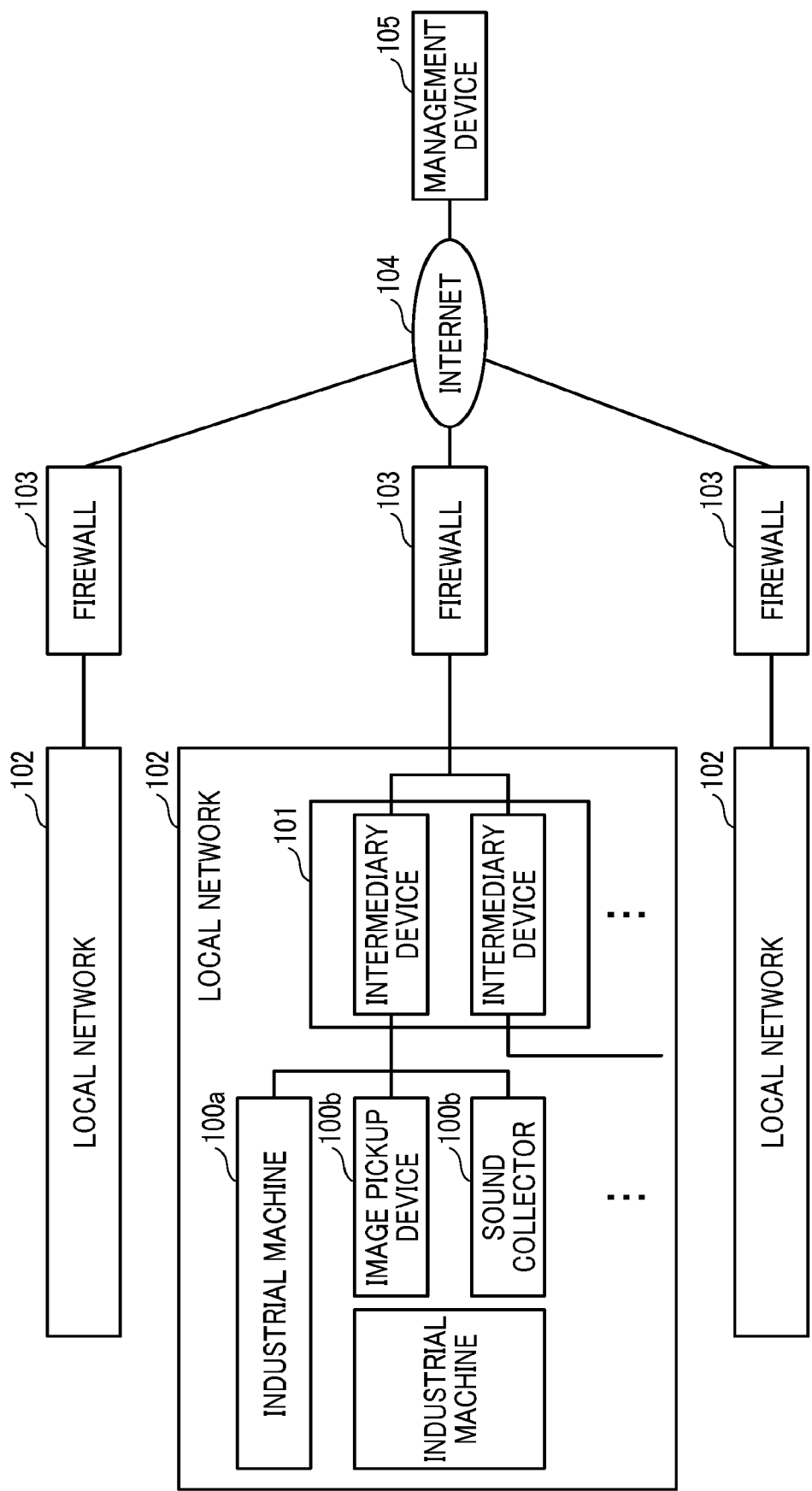
FIG. 11 is a view illustrating a configuration example of another information processing system according to the embodiment of the present invention.

At least one embodiment of the present invention is also applicable to an industrial machine management system corresponding to another information processing system. FIG. 11 is a view illustrating a configuration example of another information processing system according to the embodiment of the present invention.

The industrial machine management system illustrated in FIG. 11 includes a plurality of industrial machines 100*a* to be remotely controlled, sensors 100*b* (an image pickup device and a sound collector), an intermediary device 101 connected to the same local network 102 as the aforementioned devices (industrial machines and sensors) 100, and a management device 105 connected to the intermediary device 101 via a firewall 103 and the Internet 104. The MFP 1 illustrated in FIG. 1 corresponds to the intermediary device 101, and the device management application 6 corresponds to the management device 105. The above-described management device 105 is a device which remotely manages the devices 100 connected to the same local network 102 as the intermediary device 101 via the Internet 104. Note that the sensors 100*b* such as the image pickup device or the sound collector is attached to the industrial machine 100*a* itself or around the industrial machine 100*a*, and is configured to acquire information of the industrial machine 100*a*.

Here, a case where a plurality of firewalls 103 and management devices 105 are installed may be considered. In addition, a case where a plurality of intermediary devices 101 are installed in a single firewall 103 may be considered.

A device to be managed in the above management system is not limited to an image forming apparatus. That is, the device to be managed may be a device such as a network home appliance, a vending machine, a medical device, a 3D printer, a power supply device, an air conditioning system, or a device equipped with a communication function in a metering system for gas, water, electricity, etc. Examples of the medical device include a fundus examination device, an X-ray testing device, a blood-pressure meter, a body fat scale, an optometer, a pacemaker, and the like. The medical device transmits, to the management device, identification information of the device, an operational status of the device, whether or not an abnormal operation occurred, a result of measurement by the device, and the like. The above is transmitted in various data forms such as in the form of numerical values, text or image, etc.

Further, as a molding method of the 3D printer, methods such as a material extrusion deposition method (FDM: Fused Deposition Modeling), material jetting, binder jetting, powder sintering laminate molding method (SLS: Selective Laser Sintering), and an optical fabrication method (SLA: Stereolithography) are known. The 3D printer transmits identification information of the device, an operational status of the device, whether or not an abnormal operation occurred, the states of consumables mounted on the device, and the like, to the management device by using various kinds of information transmission means.

Although the embodiments of the present invention have been described, the present invention is not limited to these embodiments, but various variations and modifications may be made without departing from the scope of the present disclosure as claimed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus connected to a device via a first network, the information processing apparatus comprising:
a network interface configured to mediate communication between an external device, which is connected to a second network connected to the first network via a firewall, and the device;
a memory that stores a communication log related to communication between the external device and the device, and
circuitry configured to
extract, from the communication log, first information including address information of the device,
transmit the first information including the address information to an external apparatus from the information processing apparatus,
receive second information, including at least one of a host name and a vendor name of the device, from the external apparatus in response to transmitting the first information, the at least one of the host name and the vendor name corresponding to the address information transmitted to the external apparatus, and
create a list of devices, the list including, for one entry, the extracted first information including the address information and the received second information including the at least one of the host name and the vendor name of the device, stored in association with one another.

2. The information processing apparatus according to claim 1, wherein the circuitry is further configured to acquire the host name from the external apparatus connected to the second network based on an IP address of the device included in the communication log, and record the host name associated with the device and the IP address in the one entry of the list.

3. The information processing apparatus according to claim 1, wherein the circuitry is further configured to acquire the vendor name from the external apparatus, which is connected to the second network, based on a MAC address of the device included in the communication log, and record the vendor name associated with the device and the MAC address in the one entry of the list.

4. The information processing apparatus according to claim 1, wherein the circuitry is further configured to record, based on a user ID transmitted from the external device included in the communication log, the user ID associated with the device in the one entry of the list.

5. The information processing apparatus according to claim 1, wherein the circuitry is further configured to determine an operating system (OS) used by the device based on packet data included in the communication log, and record the determined OS associated with the device in the one entry of the list.

6. The information processing apparatus according to claim 5, wherein the circuitry is further configured to determine the OS used by the device based on TTL of the packet data or a window size included in the communication log.

7. An information processing system, comprising:
the information processing apparatus of claim 1;
the device configured to communicate with the information processing apparatus via a first network; and
the external device configured to communicate with the device via the information processing apparatus.

8. The information processing apparatus of claim 1, wherein the external apparatus is one of a DNS server and a MAC address management system.

9. An information processing method performed by an information processing apparatus connected to a device via a first network, the information processing method comprising:
mediating communication between an external device, which is connected to a second network connected to the first network via a firewall, and the device;
storing, in a memory, a communication log related to communication between the external device and the device; and
extracting, from the communication log, first information including address information of the device,
transmitting the first information including the address information to an external apparatus from the information processing apparatus,
receiving second information, including at least one of a host name and a vendor name of the device, from the external apparatus in response to transmitting the first information, the at least one of the host name and the vendor name corresponding to the address information transmitted to the external apparatus, and
creating a list of devices, the list including, for one entry, the extracted first information including the address information and the received second information including the at least one of the host name and the vendor name of the device, stored in association with one another.

10. The information processing method of claim 9, further comprising:
acquiring the host name from the external apparatus connected to the second network based on an IP address of the device included in the communication log,
wherein the creating step includes recording the host name associated with the device and the IP address in the one entry of the list.

11. The information processing method of claim 9, further comprising:
acquiring the vendor name from an apparatus connected to the second network based on a MAC address of the device included in the communication log,
wherein the creating step includes recording the vendor name associated with the device and the MAC address in the one entry of the list.

12. The information processing method of claim 9, wherein the creating step includes recording, based on a user ID transmitted from the external device included in the communication log, the user ID associated with the device in the one entry of the list.

13. The information processing method of claim 9, further comprising:
determining an operating system (OS) used by the device based on packet data included in the communication log,
wherein the creating step includes recording the determined OS associated with the device in the one entry of the list.

14. The information processing method of claim 13, wherein the determining step includes determining the OS used by the device based on TTL of the packet data or a window size included in the communication log.

15. A non-transitory recording medium storing a plurality of instructions which, when executed by one or more processors on an information processing apparatus connected to at least one device via a first network, cause the processors to perform a method comprising:
mediating communication between an external device, which is connected to a second network connected to the first network via a firewall, and the device;
storing, in a memory, a communication log related to communication between the external device and the device; and
extracting, from the communication log, first information including address information of the device,
transmitting the first information including the address information to an external apparatus from the information processing apparatus,
receiving second information, including at least one of a host name and a vendor name of the device, from the external apparatus-aid in response to transmitting the first information, the at least one of the host name and the vendor name corresponding to the address information transmitted to the external apparatus, and
creating a list of devices, the list including, for one entry, the extracted first information including the address information and the received second information including the at least one of the host name and the vendor name of the device, stored in association with one another.

* * * * *